(12) United States Patent
Keusen et al.

(10) Patent No.: US 10,914,216 B2
(45) Date of Patent: Feb. 9, 2021

(54) DELIVERY MODULE FOR A METERING SYSTEM FOR METERING A REDUCING AGENT INTO THE EXHAUST GAS SECTION OF A MOTOR VEHICLE, AND METERING SYSTEM

(71) Applicant: Robert Bosch GmbH, Stuttgart (DE)

(72) Inventors: Guenter Keusen, Remseck-Pattonville (DE); Volker Reusing, Asperg (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/480,362

(22) PCT Filed: Jan. 8, 2018

(86) PCT No.: PCT/EP2018/050329
§ 371 (c)(1),
(2) Date: Jul. 24, 2019

(87) PCT Pub. No.: WO2018/137914
PCT Pub. Date: Aug. 2, 2018

(65) Prior Publication Data
US 2019/0383191 A1    Dec. 19, 2019

(30) Foreign Application Priority Data

Jan. 25, 2017    (DE) .................. 10 2017 201 124

(51) Int. Cl.
*F01N 13/00*    (2010.01)
*F01N 3/20*    (2006.01)

(52) U.S. Cl.
CPC ........ *F01N 3/2066* (2013.01); *F01N 13/0097* (2014.06); *F01N 2260/26* (2013.01);
(Continued)

(58) Field of Classification Search
CPC ............... F01N 3/2066; F01N 2610/02; F01N 2610/1426; F01N 2610/1433;
(Continued)

(56) References Cited

U.S. PATENT DOCUMENTS

2007/0068525 A1*  3/2007  Offenhuber ............... A62C 3/07
                                                   128/204.21
2013/0000760 A1*  1/2013  Crary .................... F01N 3/2066
                                                   137/565.17
(Continued)

FOREIGN PATENT DOCUMENTS

DE    102009045721    4/2011
DE    102011088217    6/2013
(Continued)

OTHER PUBLICATIONS

Machine translation of KR 20130013487 A, accessed Jun. 8, 2020. (Year: 2020).*
(Continued)

*Primary Examiner* — Jonathan R Matthias
(74) *Attorney, Agent, or Firm* — Michael Best & Friedrich LLP

(57) ABSTRACT

The invention relates to a delivery module (1) for a metering system for metering a reducing agent, in particular an aqueous urea solution, into an exhaust gas section of a motor vehicle, comprising a pump (2) which is connected or can be connected to a reducing agent storage tank (4) on the suction side via a suction line (3) and to a metering module (6) on the pressure side via a delivery line (5), wherein a return line (7) which leads back into the storage tank (4) branches off from the delivery line (5). According to the invention, a filter (8) is integrated into the delivery module (1) on the suction side. The invention additionally relates to a metering system comprising such a delivery module (1).

9 Claims, 4 Drawing Sheets

(52) U.S. Cl.
CPC ...... *F01N 2340/00* (2013.01); *F01N 2560/08* (2013.01); *F01N 2610/02* (2013.01); *F01N 2610/14* (2013.01); *F01N 2610/1433* (2013.01); *F01N 2610/1473* (2013.01); *F01N 2610/1493* (2013.01)

(58) Field of Classification Search
CPC ..... F01N 2610/1446; F01N 2610/1473; F01N 2610/1486; F01N 2610/1493
See application file for complete search history.

(56) References Cited

U.S. PATENT DOCUMENTS

2015/0068194 A1* 3/2015 Gottwald ................ F01N 3/208
60/274
2018/0363531 A1* 12/2018 Bruck ................... F01N 3/2066

FOREIGN PATENT DOCUMENTS

| DE | 102011088221 | 6/2013 |
| DE | 102013201537 | 7/2014 |
| KR | 20130013487 | 2/2013 |
| WO | 2013141780 | 9/2013 |

OTHER PUBLICATIONS

International Search Report for Application No. PCT/EP2018/050329 dated Feb. 28, 2018 (English Translation, 3 pages).

* cited by examiner

DELIVERY MODULE FOR A METERING SYSTEM FOR METERING A REDUCING AGENT INTO THE EXHAUST GAS SECTION OF A MOTOR VEHICLE, AND METERING SYSTEM

BACKGROUND OF THE INVENTION

The invention relates to a delivery module for a dosing system for dosing a reducing agent, in particular an aqueous urea solution, into an exhaust tract of a motor vehicle. The invention also relates to a dosing system having such a delivery module.

Owing to ever more stringent statutory requirements for the emission values of internal combustion engines, the exhaust gases are subjected to aftertreatment for the purpose of compliance with the predefined limit values. For reducing the nitrogen oxide emissions, in particular in the case of diesel engines, use is made of reduction catalytic converters, by means of which the nitrogen oxide emissions ($NO_X$) can be significantly reduced. Before the exhaust gases pass into the catalytic converter, they are fed a reducing agent, such as for example an aqueous urea solution, which brings about the formation of ammonia, which in turn reacts with the nitrogen oxides in the catalytic converter arranged downstream to form harmless nitrogen and water. The feeding of the aqueous urea solution is realized via dosing systems which normally comprise a storage tank for storing the reducing agent, a dosing module for dosing in the reducing agent and a delivery module for delivering the reducing agent to the dosing module from the storage tank.

By way of example, DE 10 2009 045 721 A1 discloses a delivery device for a liquid reducing agent of an internal combustion engine of a motor vehicle, which delivery device comprises a storage tank for the liquid reducing agent and a delivery module, which is connected to the storage tank by lines, and also a dosing module. The dosing module is designed as a switchable dosing valve, by means of which the reducing agent is able to be injected into the exhaust tract of the motor vehicle. The reducing agent is sucked in from the storage tank via a suction line, and fed to the dosing valve via a delivery line, by means of a delivery pump of the delivery module. A first filter is arranged in the delivery line in order to prevent the introduction of particles into the dosing valve. For the purpose of protecting the delivery pump against particles, a second filter is arranged at the start of the suction line within the storage tank. A third filter is situated in a return line which branches off from the delivery line and which serves for conducting surplus reducing agent from the delivery line back into the storage tank.

Reducing agents in the form of an aqueous urea solution freeze at low ambient temperatures, and so there is regularly a risk of damage due to ice pressure in the components and lines of a dosing system. In order to prevent such damage, dosing systems which can be operated not only in a dosing mode but also in a sucking-back mode are known. In the sucking-back mode, the reducing agent present in the components and lines is delivered back into the storage tank. The sucking-back mode may be realized optionally by a reversal of the delivery direction of the delivery pump or by a valve arrangement.

In the sucking-back mode, the dosing system is flowed through in the reverse direction. In this case, dirt particles which were previously separated at a filter are detached again. Consequently, at constrictions of essential function components, in particular at valves which are assigned to the delivery pump and/or to the valve arrangement for the purpose of realizing the flow reversal, increased wear and thus leakage can occur. This can in turn result in the pressure build-up in the system being insufficient and the required reducing agent throughflow rate not being reached.

SUMMARY OF THE INVENTION

The present invention is therefore based on the object of improving the protection of a dosing system against harmful particles. In this way, the intention is for a dosing system to be provided which exhibits increased functional reliability.

The proposed delivery module comprises a pump which is connected or is able to be connected on the suction side to a reducing agent storage tank via a suction line and on the pressure side to a dosing module via a delivery line, wherein a return line which leads back into the storage tank branches off from the delivery line. According to the invention, a filter is integrated into the delivery module on the suction side. That is to say that, on the suction side of the pump, there is arranged a filter which protects the pump and all following components against particles. The arrangement on the suction side of the pump also has the advantage that particles adhering to the filter that were separated in the dosing mode do not, in a subsequent sucking-back mode, pass into regions of the system in which functionally relevant components are arranged. This is because the dirty side of the filter is averted from the functionally relevant components.

The filter integrated into the delivery module on the suction side may in particular be the main filter. That is to say that the main filter, which is normally arranged on the pressure side, is moved from the pressure side of the pump to the suction side. Moreover, it is possible to dispense with the arrangement of further filters, since the filter arranged on the suction side also keeps the pressure side of the pump free of particles.

In one refinement of the invention, it is proposed that a compensation volume is formed above the filter in the direction of gravitational force. The compensation volume arranged thereabove serves for improving the deaeration of the filter, since air can rise into the compensation volume. Moreover, said compensation volume protects against ice pressure damage, since, in the case of freezing reducing agent, an enlarged volume into which the reducing agent can expand is available. In order to lower the installation space requirement, it is proposed that the compensation volume is arranged with the filter in a common housing.

Preferably, a bypass line, leading back into the storage tank, for the bypassing of the filter and/or the compensation volume branches off from the suction line. Bypassing of the filter prevents the filter from being flowed through in the reverse direction in the sucking-back mode. This ensures no particles already separated are detached from the filter. The branch for the bypass line is arranged downstream of the filter in the main flow direction for this purpose. On the other hand, backflushing of the filter may be expressly desired, in order to clean the filter fabric. In this case, the branch is arranged upstream of the filter in the main flow direction, that is to say on the dirty side of the filter. In a manner dependent on the arrangement of the branching-off bypass line with respect to the compensation volume, it is at the same time possible to achieve bypassing of the latter, and in fact independently of whether the branch is arranged downstream or upstream of the filter in the main flow direction. Bypassing of the compensation volume prevents this from being alternately aerated and deaerated.

A check valve which is closed in the dosing mode and open in the sucking-back mode is preferably arranged in the bypass line. This ensures that reducing agent is sucked in only via the suction line, the sucked-in reducing agent has to pass through the filter and, in the dosing mode, no gas is sucked in from the return line or from the storage tank.

In order to prevent undesired opening of the check valve in the dosing mode, the opening pressure of the check valve is preferably matched to the prevailing static pressure conditions. Furthermore preferably, the opening pressure of the check valve is below the pressure difference which results from the height difference ΔH between the minimum fill level in the storage tank and the position of the check valve. This ensures that, in the sucking-back mode, it is not the case that first of all the filter and/or the compensation volume are emptied or deaerated.

As a further measure, it is proposed that the suction line is connected to the delivery module via an inlet, and the inlet is arranged above the fill level in the storage tank in the direction of gravitational force. This allows favorable static pressure conditions to be created, which counteract undesired opening of the check valve. This is because, in this case, the relevant pressure difference results from the height difference ΔH between the fill level in the storage tank and the inlet.

A 4/2-way valve for switching from the dosing mode into the sucking-back mode and vice versa is preferably integrated into the delivery module. In this case, the switching does not require reversal of the pump working direction. That is to say that even simple inexpensive pumps may be used.

According to a preferred embodiment of the invention, the pump is a diaphragm pump. Diaphragm pumps are particularly robust and require only little installation space. Since they have only one working direction, the diaphragm pump in conjunction with a 4/2-way valve is preferably proposed.

Moreover, a dosing system for dosing a reducing agent, in particular an aqueous urea solution, into an exhaust tract of a motor vehicle is proposed. The dosing system comprises a reducing agent storage tank, a dosing module, and a delivery module according to the invention. Thanks to the delivery module according to the invention, the dosing system is better protected against harmful particles and thus against wear of functionally relevant components. The reduced wear counteracts leakage, with the result that a sufficient pressure build-up and a sufficient throughflow rate is ensured even over time. Furthermore, the deaeration of the system is improved.

BRIEF DESCRIPTION OF THE DRAWINGS

Preferred embodiments of the invention will be described in more detail below on the basis of the appended drawings, in which.

DETAILED DESCRIPTION

Figure 1:
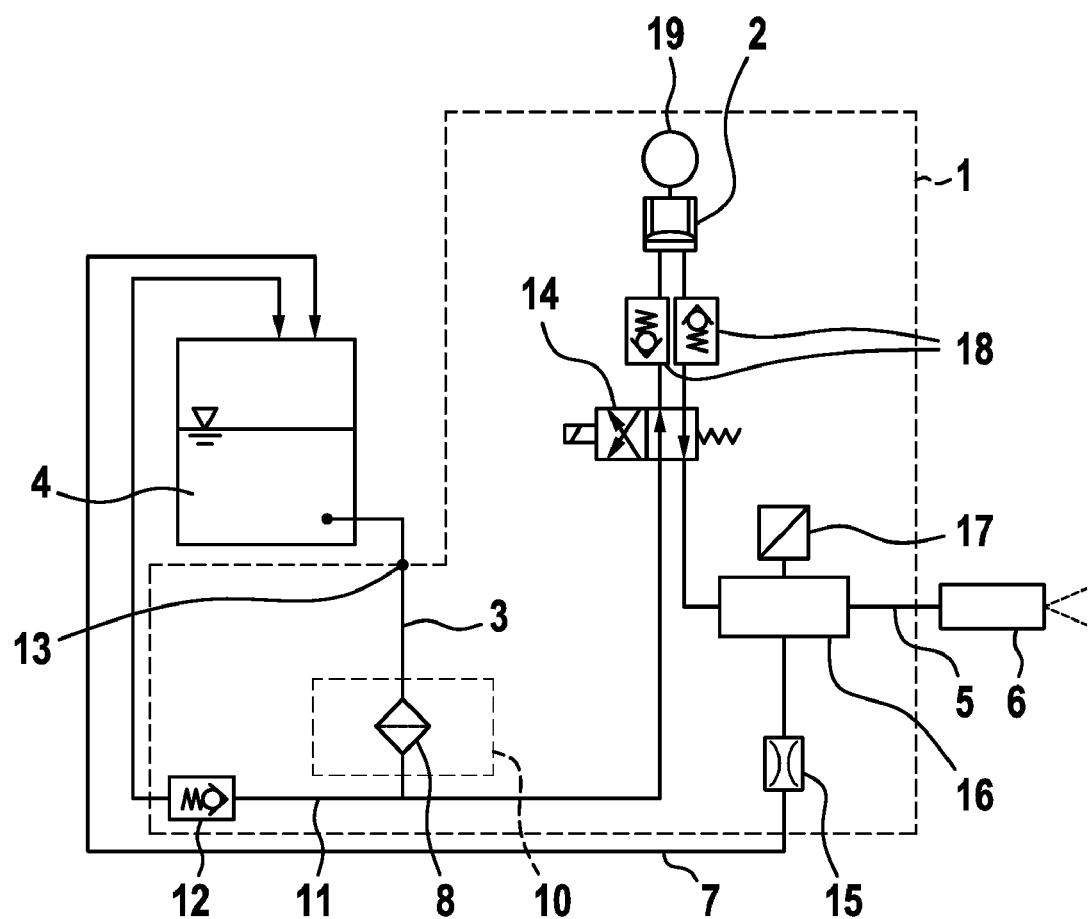
FIG. 1 shows a schematic illustration of a dosing system with a delivery module according to the invention according to a first preferred embodiment of the invention.

The dosing system illustrated in FIG. 1 comprises a reducing agent storage tank 4, a dosing module 6, by means of which the reducing agent is able to be dosed as spray into an exhaust tract (not illustrated) of a motor vehicle, and a delivery module 1, by means of which the reducing agent is able to be fed from the storage tank 4 to the dosing module 6. The delivery module 1 comprises for this purpose a pump 2 which is connected to the storage tank 4 and the dosing module 6 via multiple lines.

A first line, designed as a suction line 3, connects the pump 2 to the storage tank 4. A connection of the pump 2 to the dosing module 6 is established via a delivery line 5. A return line 7 branches off from the delivery line 5 and conducts surplus reducing agent back into the storage tank 4. The branch is arranged in the region of a compensation volume 16, which is assigned a pressure sensor 17. A throttle 15 arranged in the return line 7 prevents the pressure in the delivery line 5 from falling below a predefined limit value.

In the present case, the pump 2 is designed as a diaphragm pump, which has a motor 19 as a drive means. Since it is not possible to realize a reversal of the flow direction for emptying the system by means of a diaphragm pump, provision is also made of a 4/2-way valve 14, which is connected to the pump 2 via two check valves 18. The check valves 18 define an inlet and an outlet of the pump 2. Depending on the switching position of the 4/2-way valve 14, the dosing system is in a dosing mode or in a sucking-back mode.

The delivery module 1 of the dosing system in FIG. 1 also comprises a filter 8, which is arranged on the suction side, that is to say is arranged upstream of the pump 2 and the 4/2-way valve 14 in the main flow direction. If the 4/2-way valve 14 switches from the dosing mode into the sucking-back mode, the flow direction in the suction line 3 is reversed. In this case, a check valve 12 opens, which check valve is arranged in a bypass line 11 for the bypassing of the filter 8, so that the filter 8 is not flowed through in the reverse direction. In this way, particles already separated are prevented from detaching from the filter and passing back into the storage tank 4. Likewise, there is no risk of contamination of the functionally relevant components such as the pump 2, in particular the check valves 18 of the pump 2, and the 4/2-way valve 14, since the dirty side is situated on that side of the filter 8 which is averted from the components.

Figure 2:
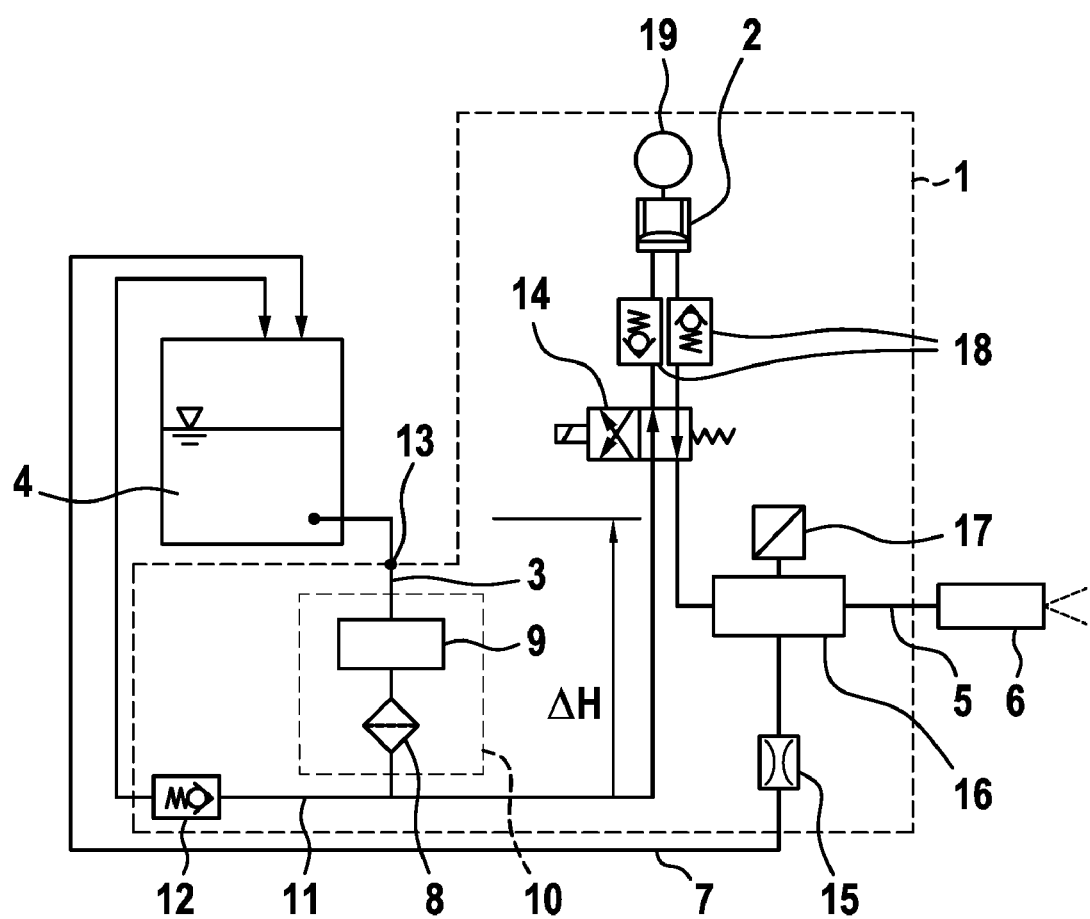
FIG. 2 shows a schematic illustration of a dosing system with a delivery module according to the invention according to a second preferred embodiment of the invention.

A refinement of the dosing system in FIG. 1 is illustrated in FIG. 2. Arranged above the filter 8 in the direction of gravitational force is additionally a compensation volume 9, which serves for the deaeration of the filter 8. Furthermore, the compensation volume 9 is capable of preventing damage due to ice pressure. The compensation volume 9 is arranged together with the filter 8 in a housing 10.

Figure 3:
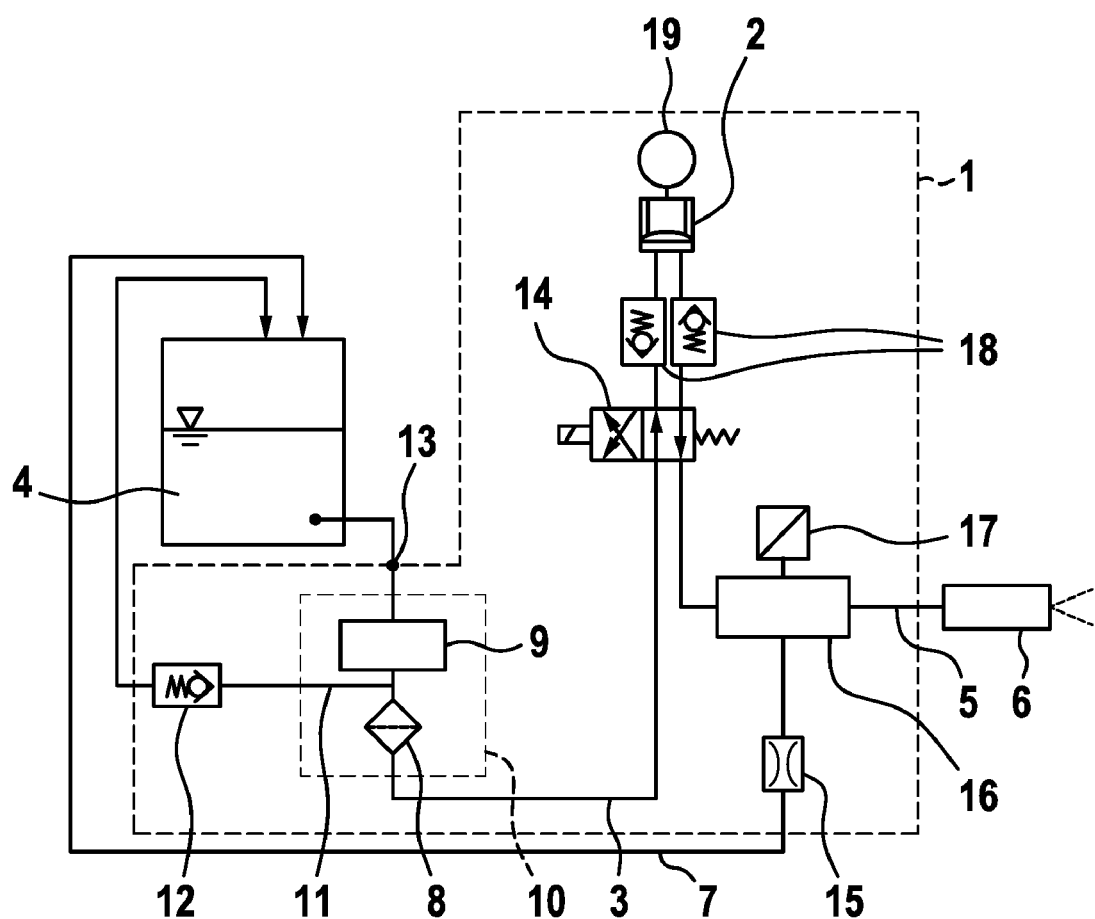
FIG. 3 shows a schematic illustration of a dosing system with a delivery module according to the invention according to a third preferred embodiment of the invention.

A modification of the dosing system in FIG. 2 is illustrated in FIG. 3. The bypass line 11 branches off above the filter 8 but below the compensation volume 9, with the result that, in the sucking-back mode, the filter 8 is backflushed but the compensation volume 9 is not emptied or deaerated. The backflushing of the filter 8 serves cleaning purposes, it being accepted that particles detached from the filter 8 pass back into the storage tank 4.

Figure 4:
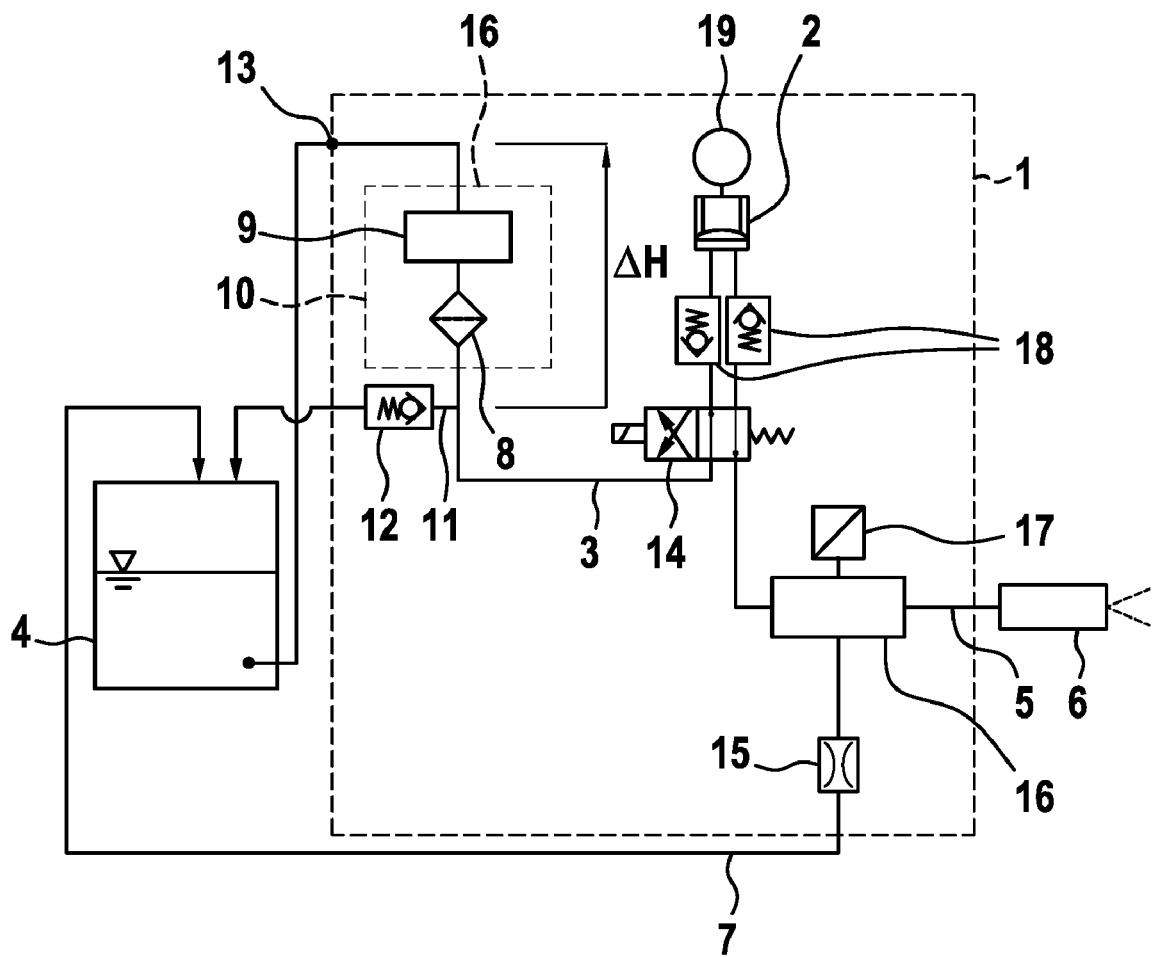
FIG. 4 shows a schematic illustration of a dosing system with a delivery module according to the invention according to a fourth preferred embodiment of the invention.

A further modification of the dosing system in FIG. 2 is illustrated in FIG. 4. In order to prevent undesired opening of the check valve 12 arranged in the bypass line 11, an inlet 13 of the delivery module 1 is brought into a position which is situated above the storage tank 4 in the direction of gravitational force. The liquid column relevant for the static pressure conditions results in this case from the height difference ΔH between the check valve 12 and the inlet 13. In the exemplary embodiment in FIG. 2, the liquid column results from the height difference ΔH between the check valve 12 and the fill level in the storage tank 4 (see FIG. 2). However, in both cases, the opening pressure of the check valve 12 should be below the resulting static pressure in order to avoid undesired opening, and thus emptying, of the filter 8 or the compensation volume 9.

What is claimed is:

1. A delivery module (1) configured to be used in a dosing system for dosing a reducing agent into an exhaust tract of a motor vehicle, the dosing system including a reducing agent storage tank (4) and a dosing module (6), the delivery module comprising
    a pump (2) configured to be connected on a suction side of the pump to the reducing agent storage tank (4) via a suction line (3) and on a pressure side of the pump to the dosing module (6) via a delivery line (5),
    wherein a return line (7) configured to lead back into the storage tank (4) branches off from the delivery line (5),
    wherein a filter (8) is integrated into the delivery module (1) on the suction side of the pump,
    wherein a bypass line (11), configured to lead back into the storage tank (4) for bypassing the filter (8), branches off from the suction line (3),
    wherein a check valve (12) which is closed in a dosing mode and open in a sucking-back mode is arranged in the bypass line (11), and
    wherein an opening pressure of the check valve (12) is below a pressure difference which results from a height difference ($\Delta H$) between a minimum fill level in the storage tank (4) and a position of the check valve (12).

2. The delivery module (1) as claimed in claim 1, characterized in that a compensation volume (9) is formed above the filter (8) in the direction of gravitational force.

3. The delivery module (1) as claimed in claim 1, characterized in that the suction line (3) is connected to the delivery module (1) via an inlet (13), and the inlet (13) is arranged above a fill level in the storage tank (4) in the direction of gravitational force.

4. The delivery module (1) as claimed in claim 1, characterized in that a 4/2-way valve (14) for switching from a dosing mode into a sucking-back mode and vice versa is integrated into the delivery module (1).

5. The delivery module (1) as claimed in claim 1, characterized in that the pump (2) is a diaphragm pump.

6. A dosing system for dosing a reducing agent into an exhaust tract of a motor vehicle, the dosing system comprising the reducing agent storage tank (4), the dosing module (6), and the delivery module (1) as claimed in claim 1.

7. The dosing system as claimed in claim 6, wherein the reducing agent is an aqueous urea solution.

8. The delivery module as claimed in claim 1, wherein the reducing agent is an aqueous urea solution.

9. A delivery module (1) configured to be used in a dosing system for dosing a reducing agent into an exhaust tract of a motor vehicle, the dosing system including a reducing agent storage tank (4) and a dosing module (6), the delivery module comprising a pump (2) configured to be connected on a suction side of the pump to the reducing agent storage tank (4) via a suction line (3) and on a pressure side of the pump to the dosing module (6) via a delivery line (5), wherein a return line (7) configured to lead back into the storage tank (4) branches off from the delivery line (5), where a filter (8) is integrated into the delivery module (1) on the suction side of the pump,
    wherein a compensation volume (9) is formed above the filter (8) in the direction of gravitational force and is arranged with the filter (8) in a common housing (10),
    wherein a bypass line (11), configured to lead back into the storage tank (4) for bypassing the filter (8) and/or the compensation volume (9) branches off from the suction line (3),
    wherein a check valve (12) which is closed in a dosing mode and open in a sucking-back mode is arranged in the bypass line (11), and
    wherein an opening pressure of the check valve (12) is below a pressure difference which results from a height difference ($\Delta H$) between a minimum fill level in the storage tank (4) and a position of the check valve (12).

* * * * *